(12) United States Patent
Lukach, Jr.

(10) Patent No.: US 9,354,121 B2
(45) Date of Patent: May 31, 2016

(54) CORROSION RESISTANT THERMOWELLS WITH THIN WALL TIPS

(71) Applicant: MICROMOLD PRODUCTS INC., Yonkers, NY (US)

(72) Inventor: Arthur S. Lukach, Jr., East Hampton, NY (US)

(73) Assignee: MICROMOLD PRODUCTS, INC., Yonkers, NY (US)

( * ) Notice: Subject to any disclaimer, the term of this patent is extended or adjusted under 35 U.S.C. 154(b) by 0 days.

(21) Appl. No.: 14/810,296

(22) Filed: Jul. 27, 2015

(65) Prior Publication Data

US 2015/0330840 A1   Nov. 19, 2015

Related U.S. Application Data

(63) Continuation-in-part of application No. 13/652,315, filed on Oct. 15, 2012, now Pat. No. 9,091,599.

(60) Provisional application No. 61/546,796, filed on Oct. 13, 2011.

(51) Int. Cl.
| | | |
|---|---|---|
| *G01K 7/02* | (2006.01) | |
| *G01K 1/14* | (2006.01) | |
| *G01K 1/16* | (2006.01) | |
| *G01K 1/08* | (2006.01) | |
| *G01K 1/10* | (2006.01) | |
| *G01K 1/12* | (2006.01) | |

(52) U.S. Cl.
CPC .. *G01K 1/08* (2013.01); *G01K 1/10* (2013.01); *G01K 1/16* (2013.01)

(58) Field of Classification Search
CPC ............. G01K 7/02; G01K 1/14; G01K 1/16; G01K 1/08; G01K 1/10; G01K 1/12
USPC ......... 374/163, 179, 208, 136, 138, 147, 148; 136/200, 224, 230
See application file for complete search history.

(56) References Cited

U.S. PATENT DOCUMENTS 3,085,438 A   4/1963   St John et al.
3,462,315 A   8/1969   Verrando et al.
(Continued)

FOREIGN PATENT DOCUMENTS

EP   0 057 984 A2   8/1982

OTHER PUBLICATIONS

Gunaratnam et al, "Thermocouple Embedding for the Production of a Substrate for Rapid Manufacturing," University of Missouri-Rolla, reviewed, accepted Aug. 28, 2007, 6 pages; http://utwired.engr.utexas.edu/lff/symposium/proceedingsArchive/pubs/Manuscripts/2007/2007-04-Gunaratnam.pdf.

*Primary Examiner* — Gail Kaplan Verbitsky
(74) *Attorney, Agent, or Firm* — IM IP Law PLLC; C. Andrew Im

(57) ABSTRACT

A corrosion resistant thermowells with thin wall tips for use in unusually difficult industrial applications such as pharmaceutical and chemical process plants and semiconductor manufacturing facilities. These facilities have process environments that may include at least one of the following: highly corrosive fluids, difficult mechanical conditions such as rapid or turbulent fluid flows, and/or reasonably high process temperatures and/or pressures. The corrosion resistant thermowells provide isolation between a temperature sensor and a fluid to be measured.

19 Claims, 17 Drawing Sheets

(56) References Cited

U.S. PATENT DOCUMENTS

| | | |
|---|---|---|
| 3,698,954 A | 10/1972 | Jones, Jr. |
| 4,344,315 A | 8/1982 | Moxon et al. |
| 4,376,280 A | 3/1983 | Davis et al. |
| 4,638,668 A * | 1/1987 | Leverberg ............... F16L 29/02 |
| | | 137/322 |
| 4,776,705 A | 10/1988 | Najjar et al. |
| 4,822,570 A | 4/1989 | Lerman et al. |
| 4,871,263 A | 10/1989 | Wilson |
| 5,197,805 A | 3/1993 | Wilson |
| 5,427,452 A | 6/1995 | Stuart |
| 5,520,461 A | 5/1996 | Curry et al. |
| 6,485,175 B1 | 11/2002 | Nimberger et al. |
| 7,018,096 B2 | 3/2006 | Benjamin |
| 7,165,883 B2 | 1/2007 | Nimberger et al. |
| 8,439,106 B2 * | 5/2013 | Hammami ............ E21B 47/011 |
| | | 166/250.01 |
| 8,864,375 B2 | 10/2014 | Abe et al. |
| 2002/0085617 A1 * | 7/2002 | Gul ........................ G01K 1/14 |
| | | 374/208 |
| 2004/0213323 A1 | 10/2004 | Benjamin |
| 2005/0242578 A1 * | 11/2005 | Evans ................... F16L 33/223 |
| | | 285/247 |
| 2008/0205484 A1 | 8/2008 | Toudou et al. |
| 2008/0205485 A1 | 8/2008 | Takahashi |
| 2011/0238281 A1 | 9/2011 | Sparks et al. |
| 2013/0223478 A1 | 8/2013 | Landis et al. |
| 2014/0109699 A1 | 4/2014 | Janitch |
| 2014/0269820 A1 | 9/2014 | Perrault et al. |
| 2015/0268314 A1 * | 9/2015 | Peterson ............. G01R 33/305 |
| | | 324/321 |
| 2015/0273616 A1 * | 10/2015 | Cooper ................. B23K 9/173 |
| | | 219/137.42 |

* cited by examiner

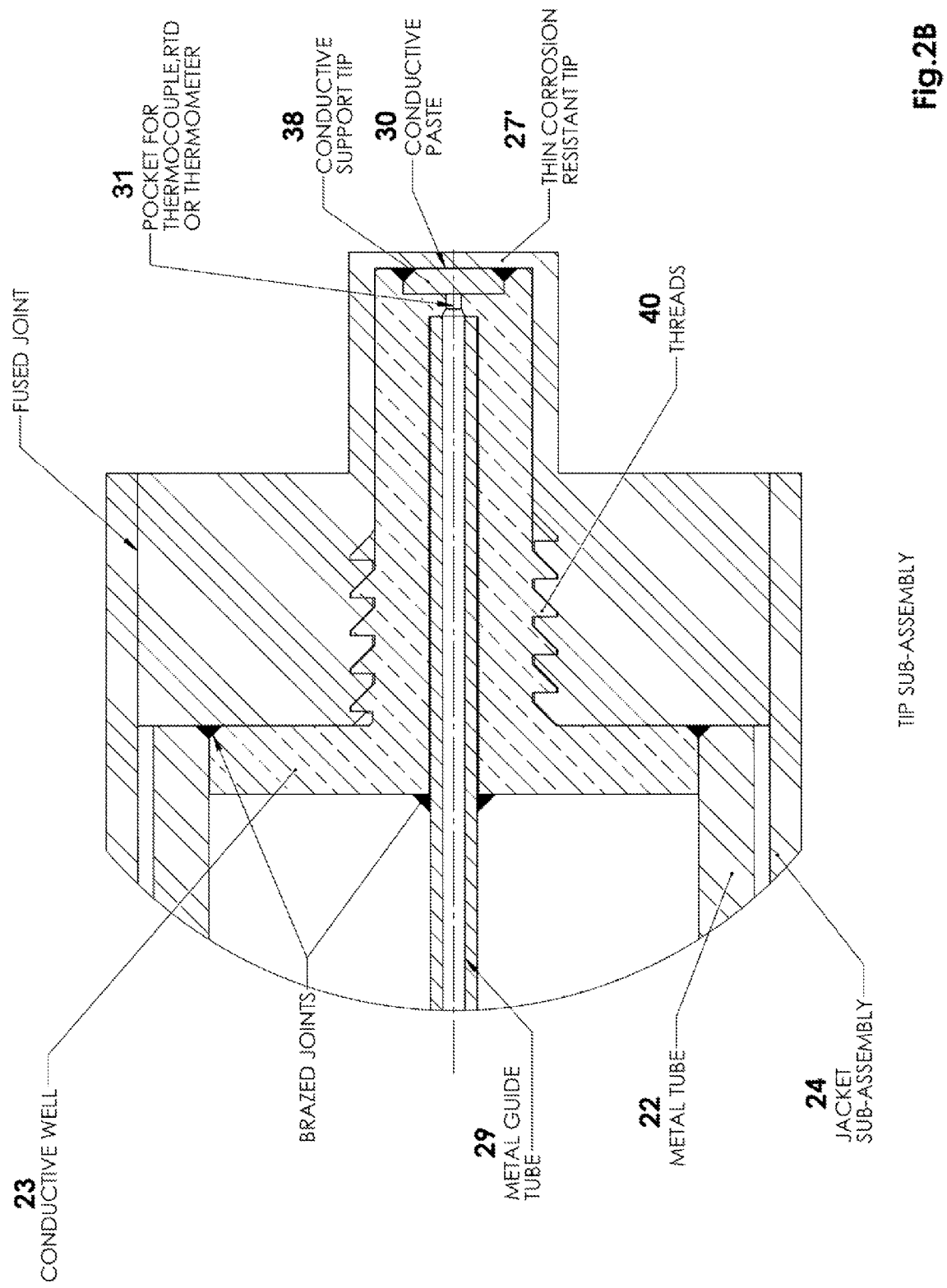

SECTION B-B

METAL FLANGE

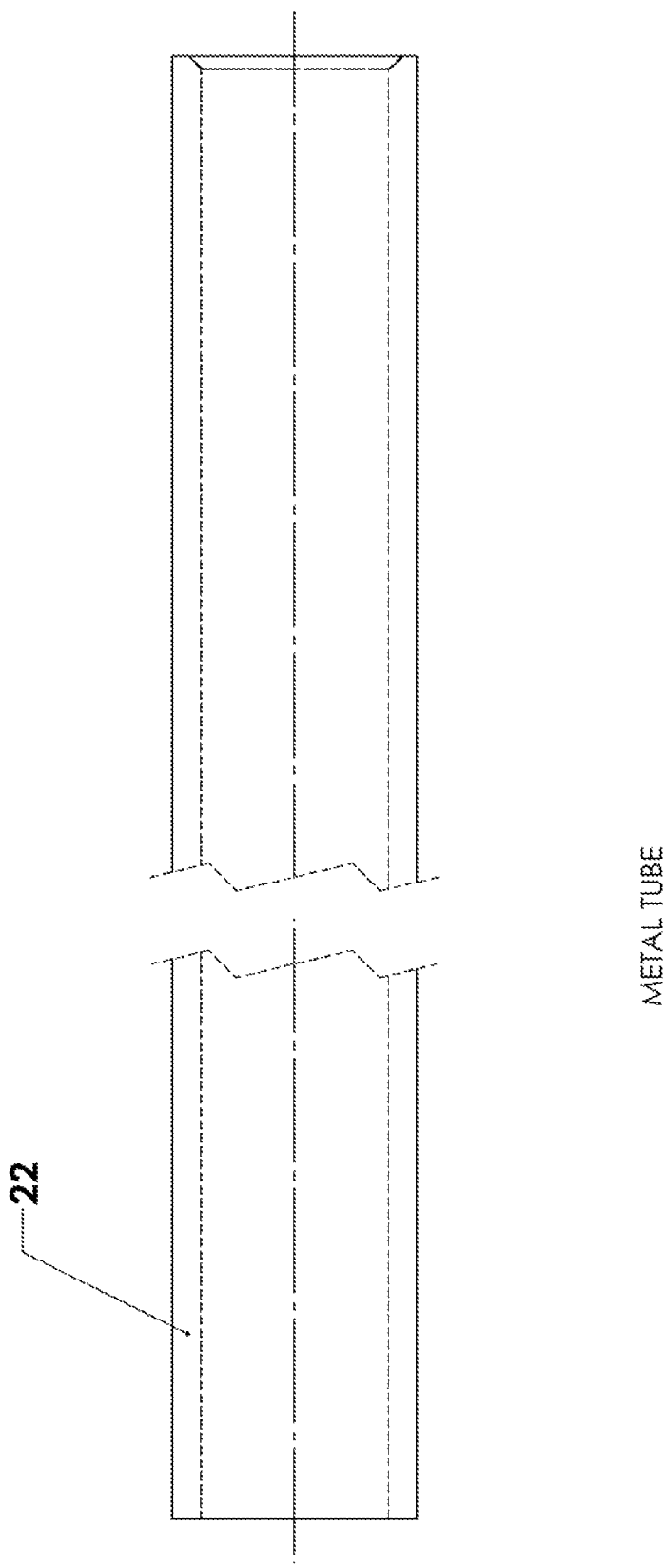

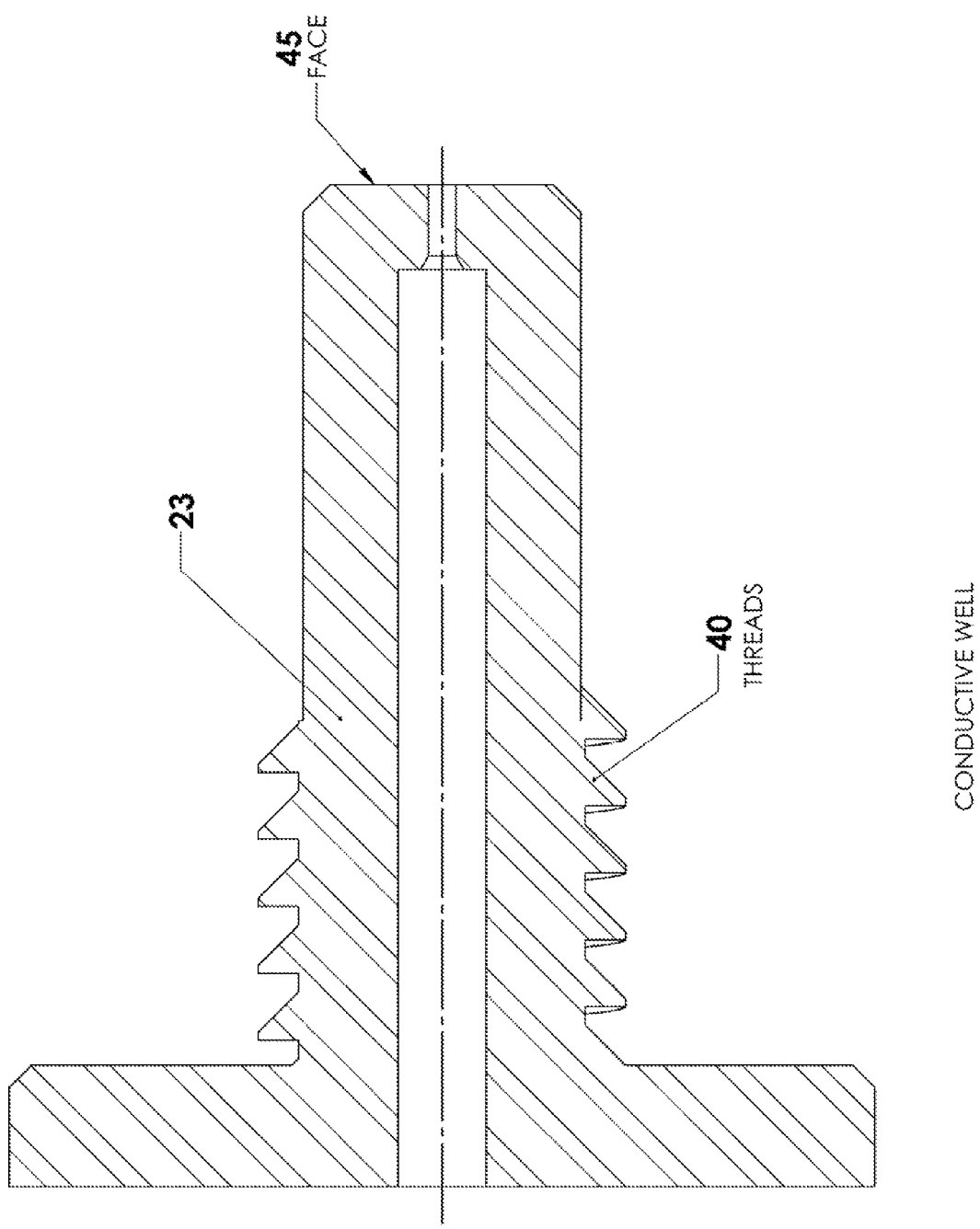

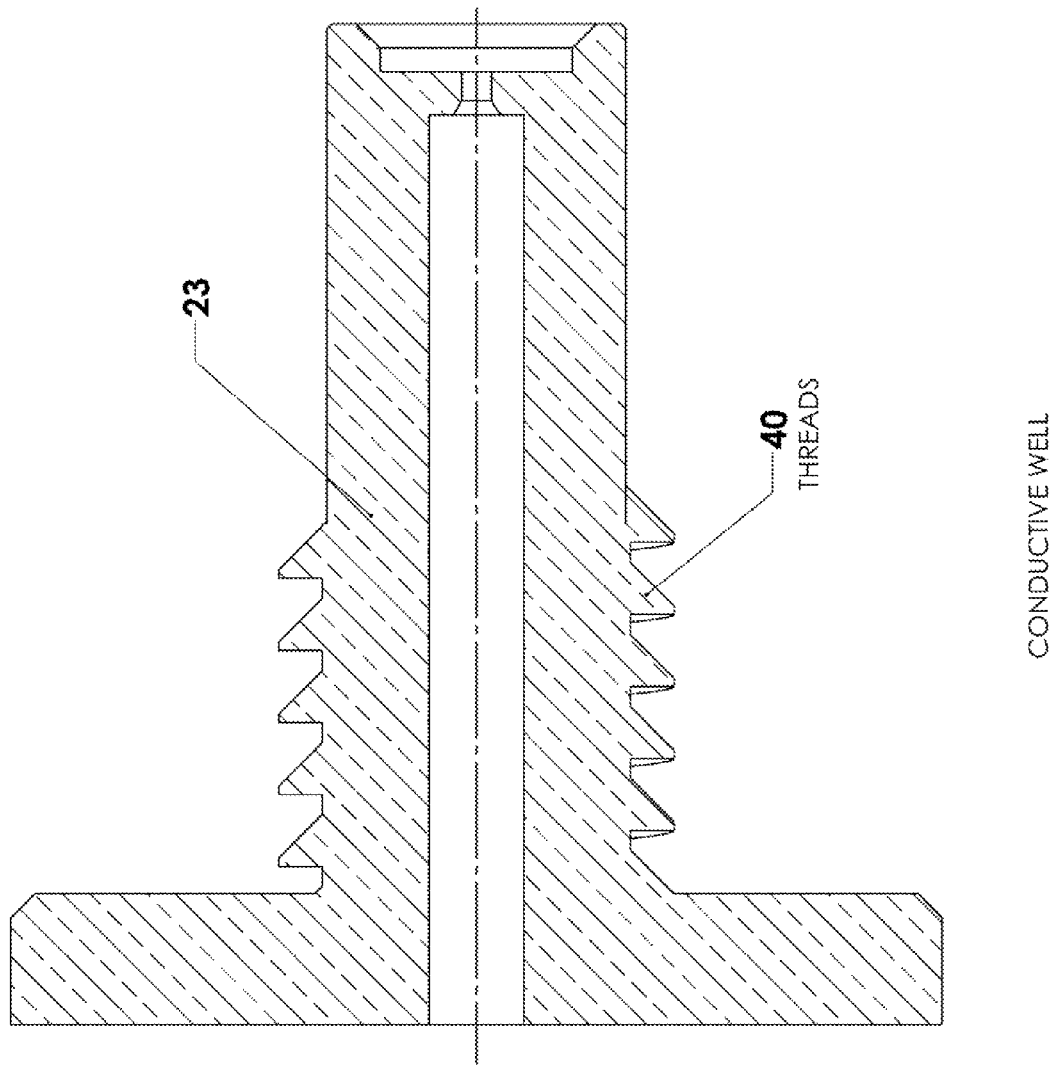

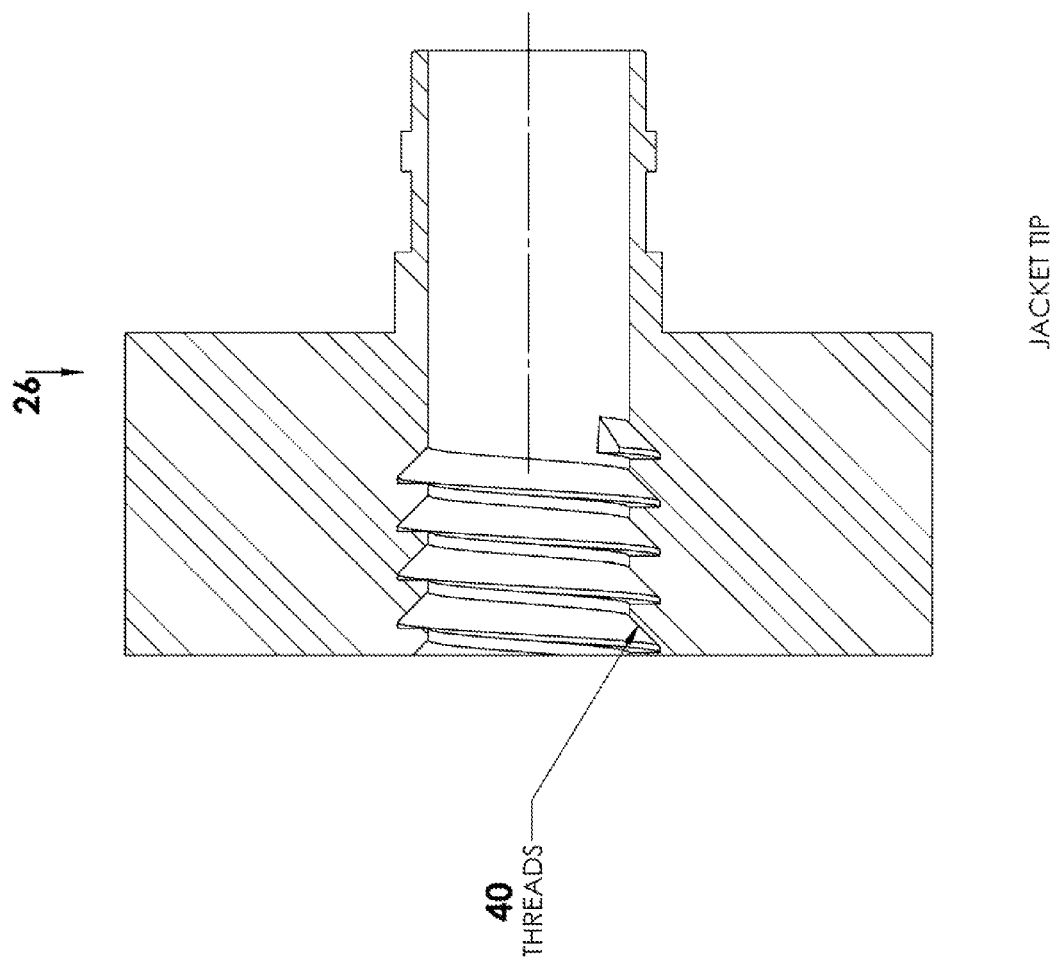

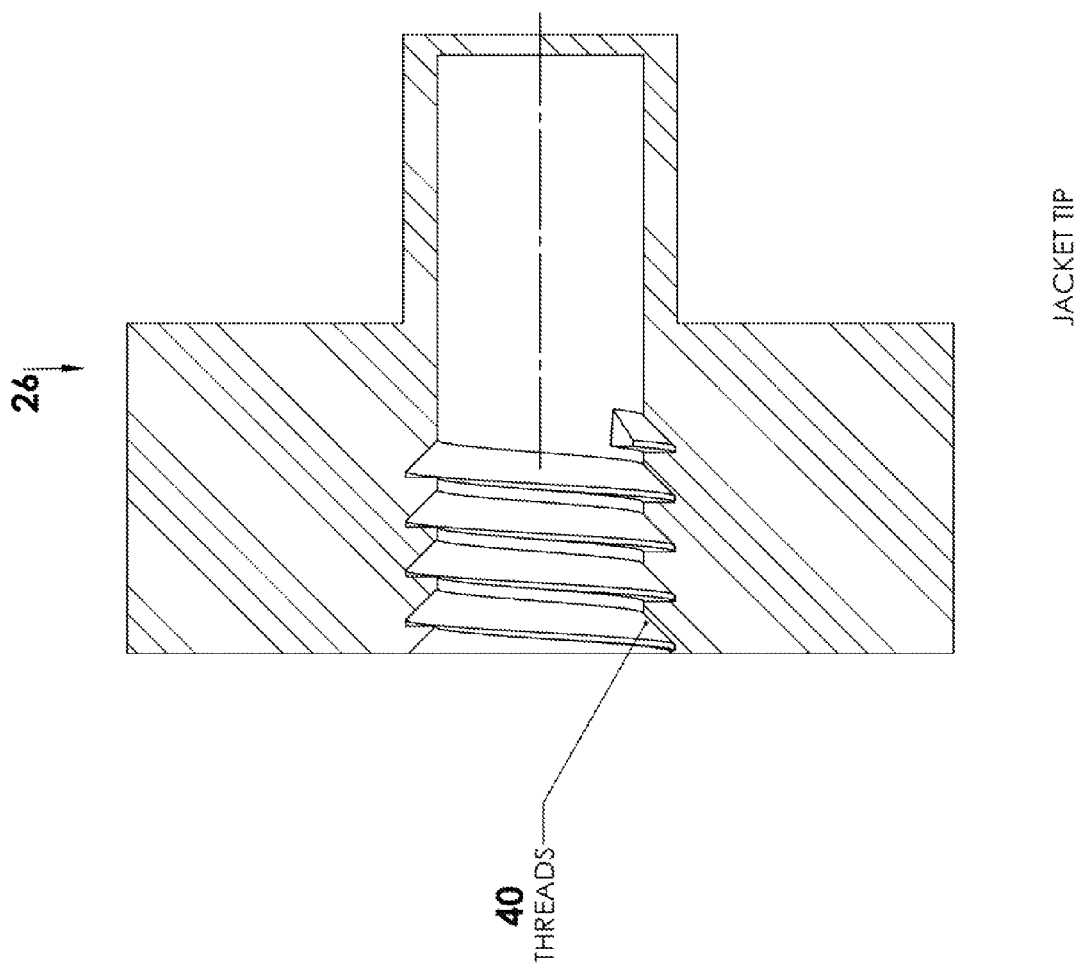

US 9,354,121 B2

CORROSION RESISTANT THERMOWELLS WITH THIN WALL TIPS

RELATED APPLICATION

This application is a continuation-in-part of application Ser. No. 13/652,315 filed Oct. 15, 2012, which claims the benefit of U.S. Provisional Application No. 61/546,796 filed Oct. 13, 2011, which is incorporated herein by reference in its entirety.

FIELD OF THE INVENTION

The claimed invention relates to PTFE (polytetrafluoroethylene) jacketed tantalum tipped and also PTFE tipped thermowells, more particularly to thermowells for use in unusually difficult industrial applications.

BACKGROUND OF THE INVENTION

Thermowells are commonly used in industry to protect sensitive temperature measurement instruments such as thermocouples, RTDs (Resistance Temperature Detectors), or thermometers from conditions of process fluids that may cause the bare instrument to suffer damage. The claimed invention relates to a new configuration for the construction of such thermowells for use in unusually difficult industrial applications such as pharmaceutical and chemical process plants, semiconductor manufacturing facilities and other similar facilities with process environments that may include some or all of:
  Highly corrosive fluids
  Difficult mechanical conditions such as rapid or turbulent fluid flows
  Reasonably high process temperatures and/or pressures.

In such industrial applications, maintaining tight control over process temperatures via quick detection and feedback of temperature changes is highly desirable to maintain the most efficient and effective processes. This problem is usually taken care of by employing carbon steel, stainless steel or other common metal thermowells. For highly corrosive environments where common metals do not stand up, the wells may be coated with corrosions resistant materials such as PTFE or made from solid PTFE or similar material.

In certain cases where unusually aggressive instances of the situations described above are encountered, PTFE jackets much thicker than coatings are employed, often with corrosion resistant tantalum cups to improve the sensitivity may be employed.

However all the above solutions have limitations that prevent their use in the most aggressive environments while achieving sensitivities that foster efficient processes. They may:
  Have length limitations
  Not be strong enough to handle fast moving or agitated fluids or
  If fabricated to overcome such limitations, lose sensitivity slowing reaction times to process temperature changes.

These situations provide an opportunity to overcome such limitations by using a combination of some previously employed design elements plus new design elements in a unique combination that allows much improved fluid temperature measurement and control in aggressive fluid environments.

OBJECTS AND SUMMARY OF THE INVENTION

In view of the above-described shortcomings in the art, it is an object of the claimed invention to provide a corrosion resistant thermowells with thin wall tips, preferably, one that can be used in unusually difficult industrial applications such as pharmaceutical and chemical process plants, semiconductor manufacturing facilities and other similar facilities with process environments that may include some or all of: highly corrosive fluids, difficult mechanical conditions such as rapid or turbulent fluid flows, and/or reasonably high process temperatures and/or pressures.

The importance of well-designed, high quality thermowells used widely in industrial applications cannot be overemphasized. They need to be strong, highly corrosion resistant, and allow for quick response to changes in temperature. Further, there is a need to provide a design with the flexibility to be tuned to avoid vibrations that can be induced by fluid flows.

There have been many instances of thermowell failures, many of which have been attributed to such vibrations induced by fluid flows. One such well-publicized event occurred in 1995, when the failure of a thermowell from vibration at the Monju nuclear power plant in Japan caused leakage of molten sodium coolant resulting in the shutdown of the plant.

It is an object of the claimed invention are to provide a thermowell that protects the most sensitive and responsive thermocouples, RTDs, or thermometers that are usually thin to provide high sensitivity; for example, those as small as $1/16$" diameter.

It is an object of the claimed invention to provide a thermowell that provides high corrosion resistance by allowing the basic metal well to be encapsulated by a jacket made from a corrosion resistant material, preferably a highly corrosion resistant material, such as polytetrafluoroethylene (PTFE).

It is an object of the claimed invention to provide a thermowell that enables the basic metal well to be made from commercially available pipes or tubes. Such pipe or tube enable a wide choice in preparing a design that is flexible enough to incorporate as needed, large diameters, heavy wall thicknesses, high strength metals and/or corrosion resistant metals where users require that for a wide variety of fluid measurement applications.

It is an object of the claimed invention to provide a thermowell that provides enhanced conductivity and thus responsiveness by employing a cup, at the point which temperature needs to be measured, made from corrosion resistant metal conductive material (such as tantalum) or from a thin-walled corrosion resistant plastic material (such as PTFE) while controlling costs by utilizing at the point which temperature needs to be measured, a small diameter and thin wall design.

It is an object of the claimed invention to provide the thermowell as aforesaid that further enhances conductivity and responsiveness while controlling costs by utilizing a step-down diameter for the tip.

It is an object of the claimed invention to provide a thermowell that enables the use of commercially available thermocouples, RTDs, and thermometers that feature thin diameters and spring loading. The former enables greater instrument sensitivity and the latter ensures close contact of the tip to the metal housing at the bottom.

It is an object of the claimed invention to provide the thermowell as aforesaid that allows for comparatively easy and accurate insertion of thin diameter thermocouples, RTDs, and thermometers by creating a centering insertion guide using a strong metal tube (such as a stainless steel tube) that leads to a conductive material such as copper at the tip. In the tantalum tipped embodiment the copper at the tip also acts as a reinforcement for the thin wall cup to permit use of the wells at higher pressures. In the PTFE tipped embodiment the copper at the tip also acts as a reinforcement for the thin PTFE wall at the tip to permit use of the wells at higher pressures.

It is an object of the claimed invention to provide the thermowell as aforesaid whose design permits the manufacture of varying lengths—short ones to be used in piping systems, often inserted into elbows or tees, and long ones to reach far into large process vessels and normally installed in vessel nozzles It is an object of the claimed invention to provide the thermowell as aforesaid that can be tuned to avoid vibrations induced by fluid flows by utilizing a highly flexible arrangement of design elements.

It is an object of the claimed invention to provide the thermowell as aforesaid that can be specified with flanged connections to ensure strong connections to industry standard piping and vessel systems.

It is an object of the claimed invention to provide the thermowell as aforesaid that further ensures quick response to fluid temperature changes by incorporating a conductive paste at the critical contact surface.

In accordance with an exemplary embodiment of the claimed invention, a device provides isolation between a temperature sensor and a fluid to be measured. A metal guide tube of the device receives the temperature sensor. The metal guide tube has a top end and a bottom end. A conductive well of the device has a top end and a bottom end having a base. The top end has an outer diameter greater than an outer diameter at the bottom end. The outer diameter at the bottom end being partially threaded with buttress threads. The conductive well surrounds the bottom end of the metal guide tube. The conductive well is brazed to the metal guide tube. A metal tube of the device surrounds the top end of the conductive well and a remaining portion of the metal guide tube. The conductive well is brazed to the metal tube. A corrosion resistant jacket subassembly of the device has at least two outer diameters excluding a corrosion resistant flare and encapsulates the metal tube and a remaining portion of the conductive well not surrounded by the metal tube. A thin walled, corrosion resistant and heat conductive metal cup of the device has an outer diameter smaller than a larger of the two outer diameters of the corrosion resistant jacket subassembly. The corrosion resistant and heat conductive metal cup is located at a base of the conductive well and entirely covers a bottom end of the corrosion resistant jacket subassembly. A metal flange of the device secures a top end of the device and surrounds the metal guide tube at the top end opposite the corrosion resistant and heat conductive cup. A metal half coupling of the device is connected to the metal flange. The corrosion resistant flare at the end of the corrosion resistant jacket subassembly seals to a bottom face of the metal flange. The corrosion resistant flare has an outside diameter covering part or all of the bottom face of the flange and an inside diameter substantially equal to the larger of two outer diameters of the corrosion resistant jacket subassembly. The base of the conductive well comprises an opening to receive a tip of the temperature sensor.

In accordance with an exemplary embodiment of the claimed invention, the aforesaid conductive well is a copper conductive well.

In accordance with an exemplary embodiment of the claimed invention, the aforesaid corrosion resistant and heat conductive cup is a tantalum cup covering the base of the conductive well to provide a quick response to temperature changes.

In accordance with an exemplary embodiment of the claimed invention, the aforesaid corrosion resistant and heat conductive cup is a vanadium cup covering the base of the conductive well to provide a quick response to temperature changes.

In accordance with an exemplary embodiment of the claimed invention, the aforesaid metal tube is made from one of the following: carbon steel, stainless steel or alloy.

In accordance with an exemplary embodiment of the claimed invention, the aforesaid corrosion resistant jacket subassembly is a polytetrafluoroethylene (PTFE) jacket.

In accordance with an exemplary embodiment of the claimed invention, the aforesaid conductive well is a threaded conductive well and the corrosion resistant jacket subassembly is threaded to fit onto the threaded conductive well.

In accordance with an exemplary embodiment of the claimed invention, the aforesaid corrosion resistant and heat conductive cup is swaged over the corrosion resistant jacket subassembly to provide a leak tight seal.

In accordance with an exemplary embodiment of the claimed invention, the aforesaid corrosion resistant jacket subassembly comprises two components that are fused or welded together.

In accordance with an exemplary embodiment of the claimed invention, a face at the base of the aforesaid conductive well is installed using a thin layer of conductive paste to further improve response time.

In accordance with an exemplary embodiment of the claimed invention, a device provides isolation between a temperature sensor and a fluid to be measured. A metal guide tube of the device receives the temperature sensor. The metal guide tube has a top end and a bottom end. A conductive well of the device has a top end and a bottom end having a base. The top end has an outer diameter greater than an outer diameter at the bottom end. The conductive well surrounds the bottom end of the metal guide tube. The conductive well is brazed to the metal guide tube. A metal tube of the device surrounds the top end of the conductive well and a remaining portion of the metal guide tube. The conductive well is brazed to the metal tube. A corrosion resistant jacket subassembly of the device has at least two outer diameters excluding a corrosion resistant flare and encapsulates the metal tube and a remaining portion of the conductive well not surrounded by the metal tube. A thin walled, corrosion resistant plastic tip of the device has an outer diameter smaller than a larger of the two outer diameters of the corrosion resistant jacket subassembly. The corrosion resistant plastic tip is located at a base of the conductive well and entirely covers and contiguous with the bottom end of the corrosion resistant jacket subassembly. A metal flange of the device secures a top end of the device and surrounds the metal guide tube at the top end opposite the corrosion resistant plastic tip. A metal half coupling of the device is connected to the metal flange. The corrosion resistant flare at the end of the corrosion resistant jacket subassembly seals to a bottom face of the metal flange. The corrosion resistant flare has an outside diameter covering part or all of the bottom face of the flange and an inside diameter substantially equal to the larger of two outer diameters of the corrosion resistant jacket subassembly. The base of the conductive well comprises an opening to receive a tip of the temperature sensor.

In accordance with an exemplary embodiment of the claimed invention, the aforesaid corrosion resistant plastic tip is a corrosion resistant plastic film or membrane covering the base of the conductive well and responsive to temperature changes.

In accordance with an exemplary embodiment of the claimed invention, the aforesaid corrosion resistant jacket subassembly is threaded to fit onto the conductive well that is partially threaded with buttress threads.

In accordance with an exemplary embodiment of the claimed invention, the aforesaid corrosion resistant plastic tip is a contiguous part of the corrosion resistant jacket subassembly.

BRIEF DESCRIPTION OF THE DRAWINGS

FIGS. 2A-2B are detailed cross-sectional schematic views of the respective thin wall tip area of the corrosion resistant thermowells of FIGS. 1A-B in accordance with an exemplary embodiment of the claimed invention;

FIG. 4 is a cross-sectional schematic view of the metal tube of the corrosion resistant thermowells in accordance with an exemplary embodiment of the claimed invention;

FIGS. 5A-B are cross-sectional schematic views of the respective conductive wells of the corrosion resistant thermowells of FIGS. 1A-B in accordance with an exemplary embodiment of the claimed invention;

FIGS. 8A-B are cross-sectional schematic views of a respective tip of the PTFE jacket of the corrosion resistant thermowells of FIGS. 1A-B in accordance with an exemplary embodiment of the claimed invention;

FIG. 12 is a cross-sectional view of the metal guide tube of the corrosion resistant thermowell in accordance with an exemplary embodiment of the claimed invention, and While in the illustrated embodiments features of the invention have been put forward, it is to be understood that the invention is not limited to the precise form illustrated, and the changes may be made thereto without departing from the spirit or substance of the invention.

DETAILED DESCRIPTION OF THE EMBODIMENTS

Figure 1A:
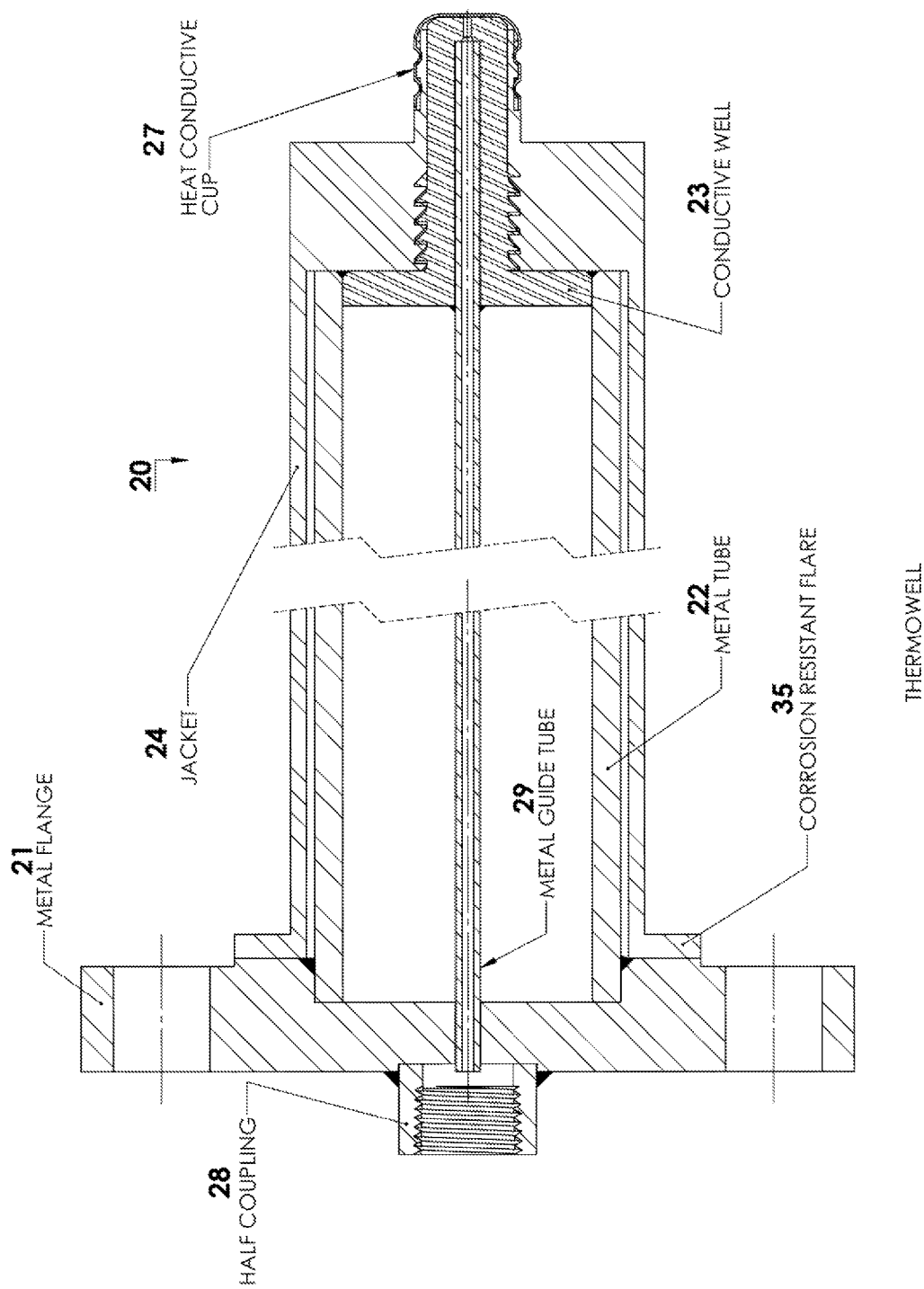
FIGS. 1A-B are cross-sectional schematic views of a corrosion resistant thermowell with thin wall tip in accordance with an exemplary embodiment of the claimed invention.
Figure 1B:
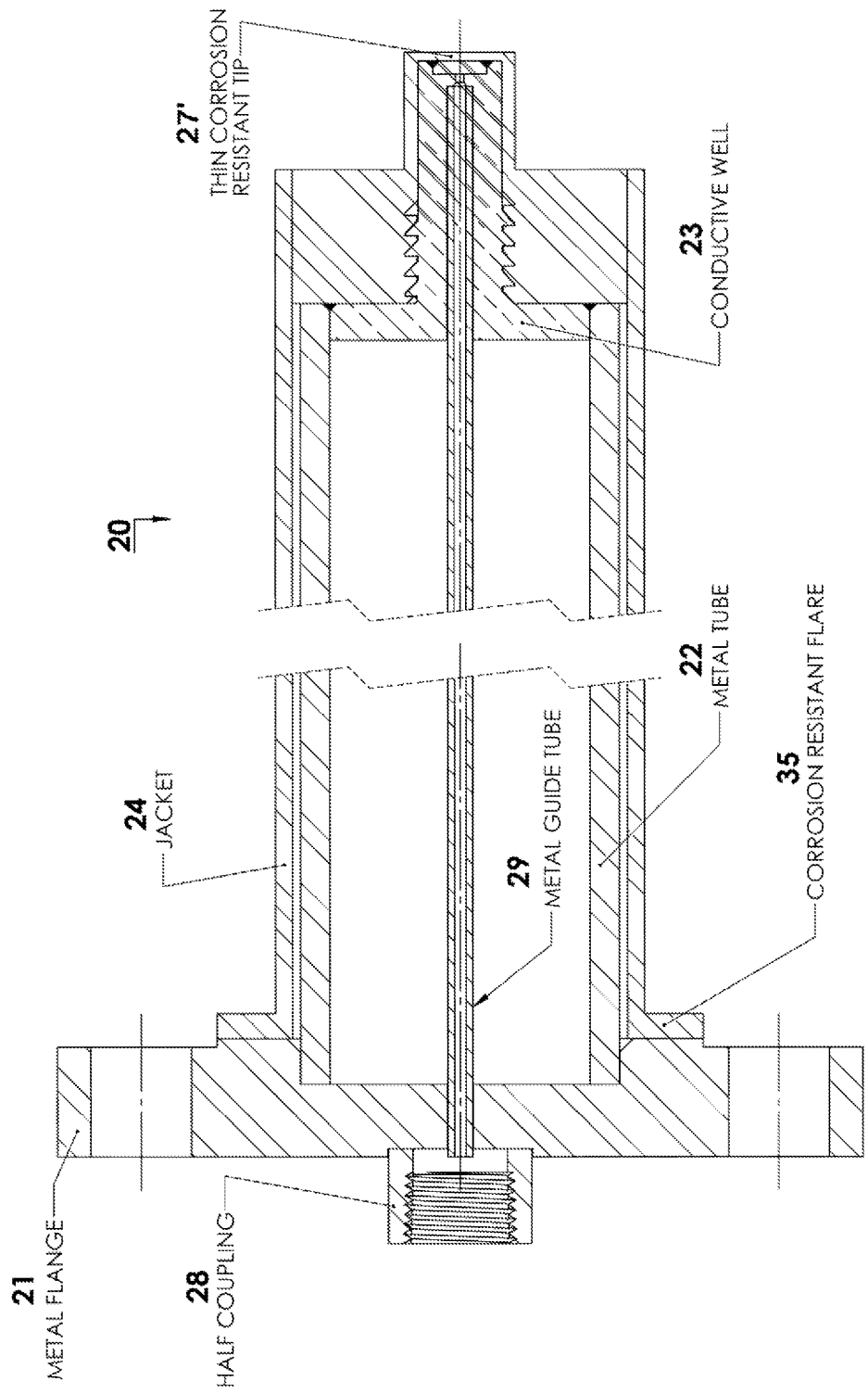

Referring to the drawings in detail, FIGS. 1A-B show the thermowells 20 in accordance with an exemplary embodiment of the claimed invention. Thermowells are commonly used in process containment devices such as process vessels or pipes to protect sensitive temperature measuring devices such as thermocouples, RTDs, or thermometers from damage due to rapid fluid flows and/or aggressively corrosive environments. The claimed thermowell provides extreme corrosion resistance at temperatures up to the allowable temperatures for the polytetrafluorethylene (PTFE) material, i.e., 260° C. (500° F.).

As shown in FIGS. 1A-1B, the claimed thermowell 20 has a shell comprising a metal flange 21, a metal tube 22 and a conductive well 23, that can be made from readily available metals. The shell provides the basic structure and strength of the thermowells 20. The particular design features of the claimed thermowells 20 allow for the use of an unusually wide range of lengths and diameters. Long lengths (up to 4 meters or more) are often needed to provide quick response to changes in fluid temperature at a remote point, one that can be reached by insertion of long length thermowell 20 into a flanged opening in a process vessel or pipe. Large diameters (up to 100 mm or more) are often needed to provide extra strength to such long length thermowells 20 to resist rapid and/or turbulent fluid flows.

Figure 2A:
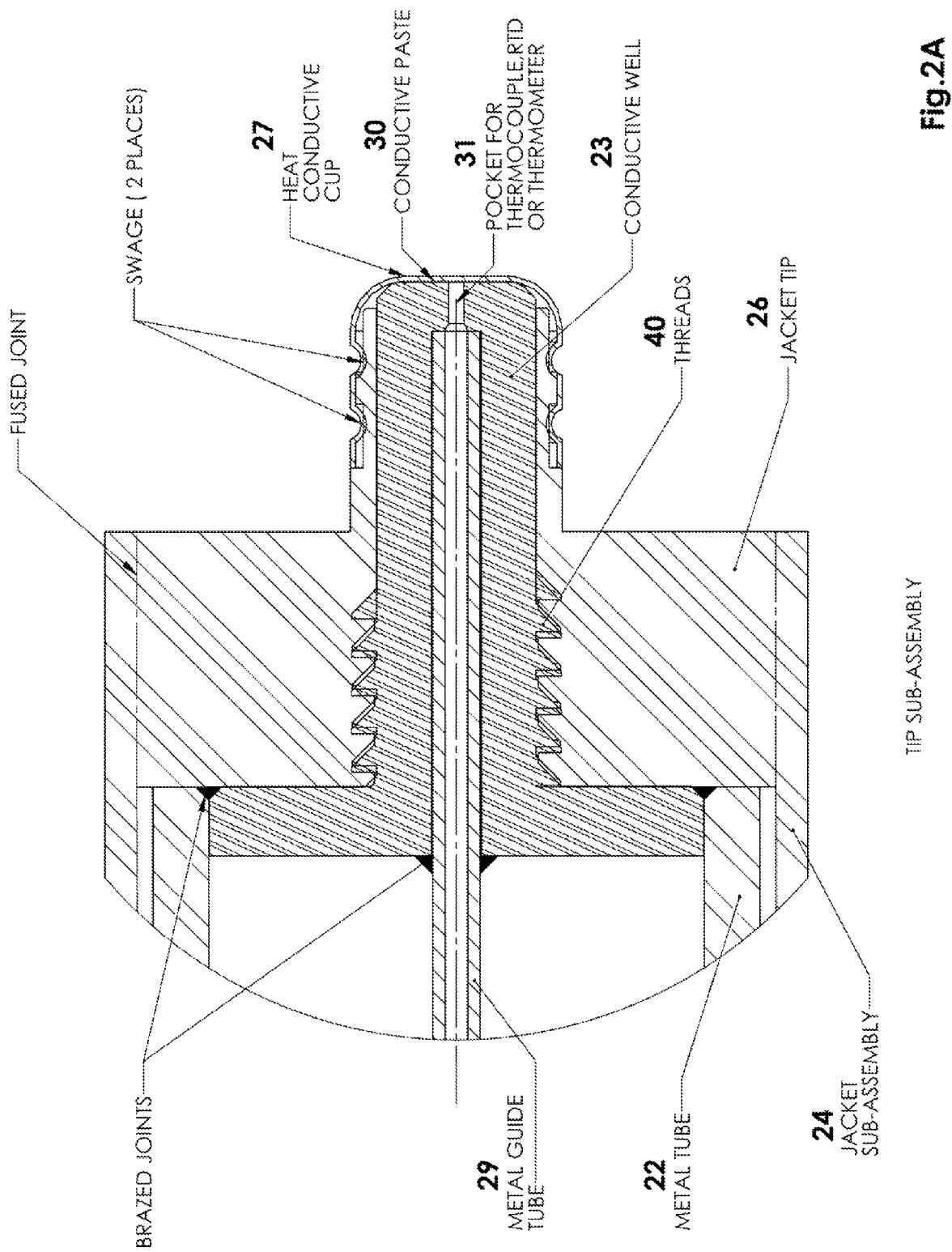

The common metals used for the metal flange 21, the metal tube 22 and the conductive well 23 can be, but not limited to, carbon steel, stainless steel, or other alloys such as Monel®. Monel® is a registered trademark of Huntington Alloys Corporation. As shown in FIGS. 1A-B and 5A-B, in accordance with an exemplary embodiment of the claimed invention, a highly conductive material such as copper can be used at the tip to provide the conductive well 23 with superior sensitivity to changes in temperature at the remote point where the measuring tip of the thermocouple or thermometer is located. As shown in FIGS. 1A-B, in accordance with an exemplary embodiment of the claimed invention, the metal tube 22 is welded or brazed to the metal flange 21. As shown in FIGS. 2A-B, in accordance with an exemplary embodiment of the claimed invention, the conductive well 23 is brazed to the metal tube 22.

Figure 3A:
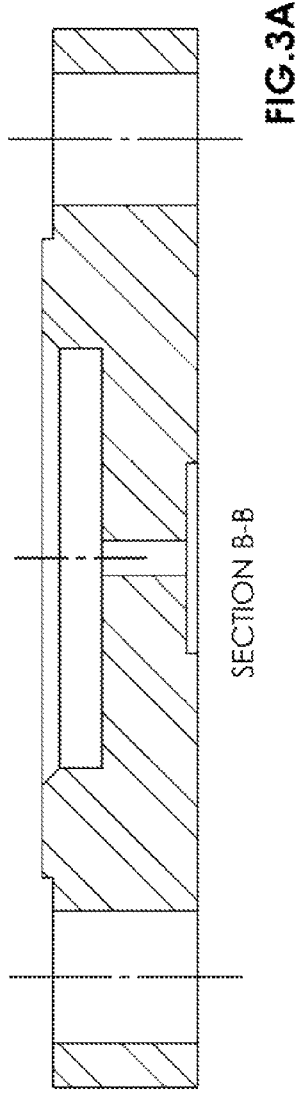
FIGS. 3A-3B show various schematic views of the metal flange of the corrosion resistant thermowell in accordance with an exemplary embodiment of the claimed invention.
Figure 3B:
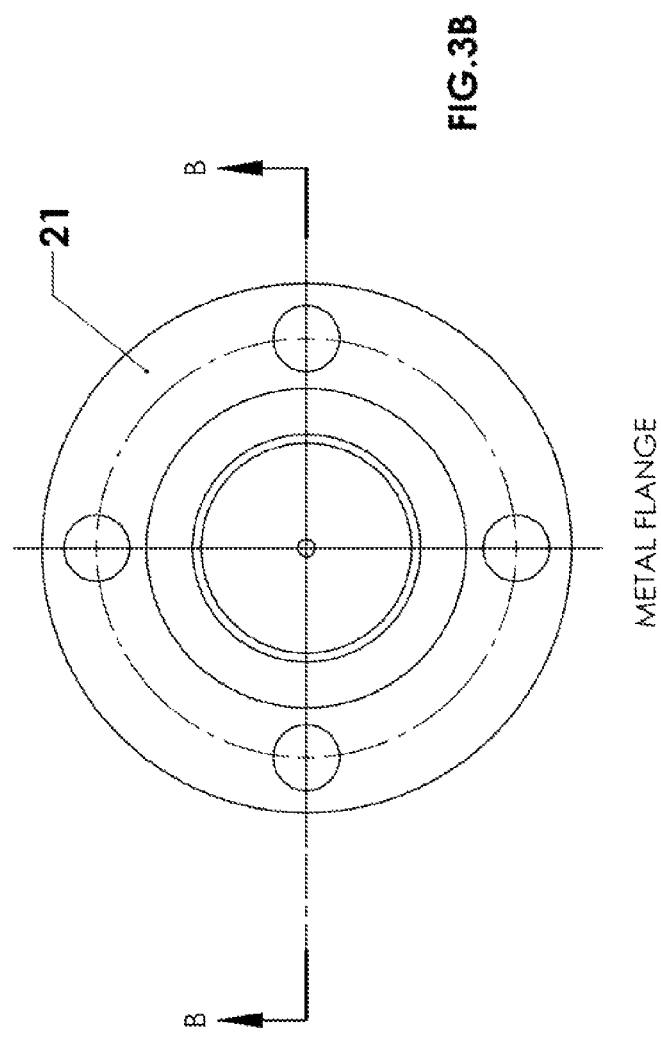
Figure 6A:
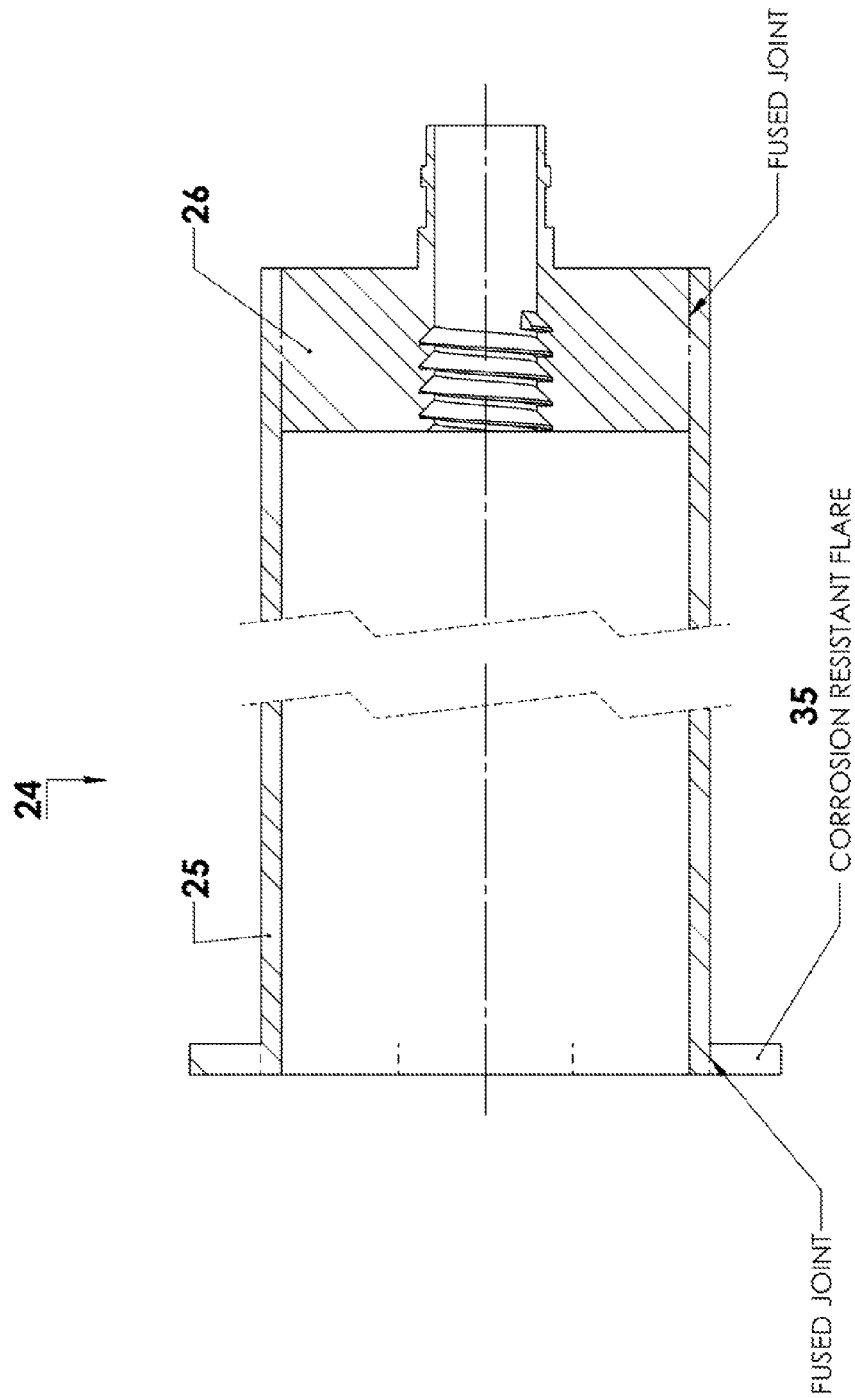
FIGS. 6A-6B are cross-sectional schematic views of a respective section or sub-assembly of the PTFE jacket of the corrosion resistant thermowells of FIGS. 1A-B in accordance with an exemplary embodiment of the claimed invention.
Figure 6B:
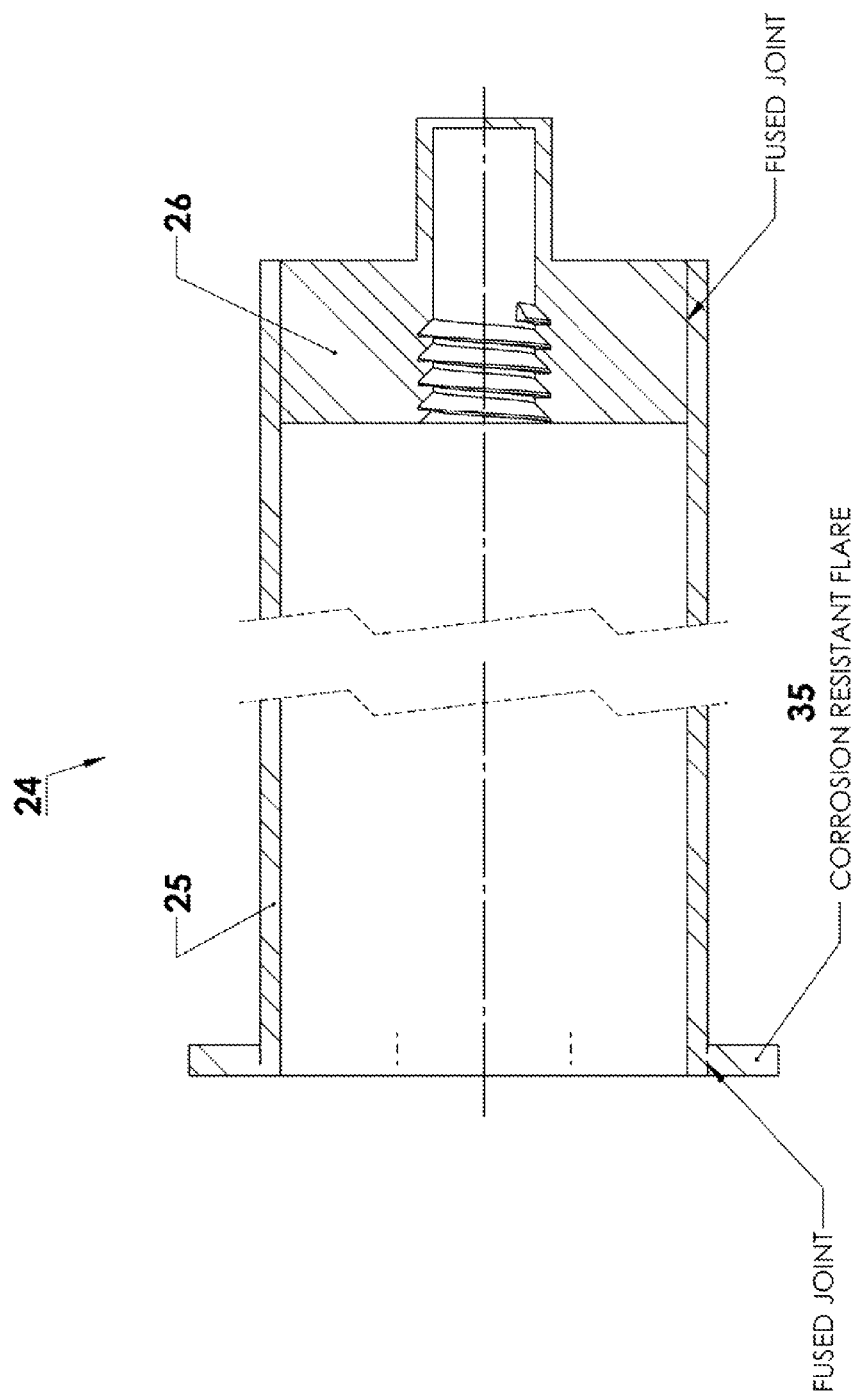
Figure 7:
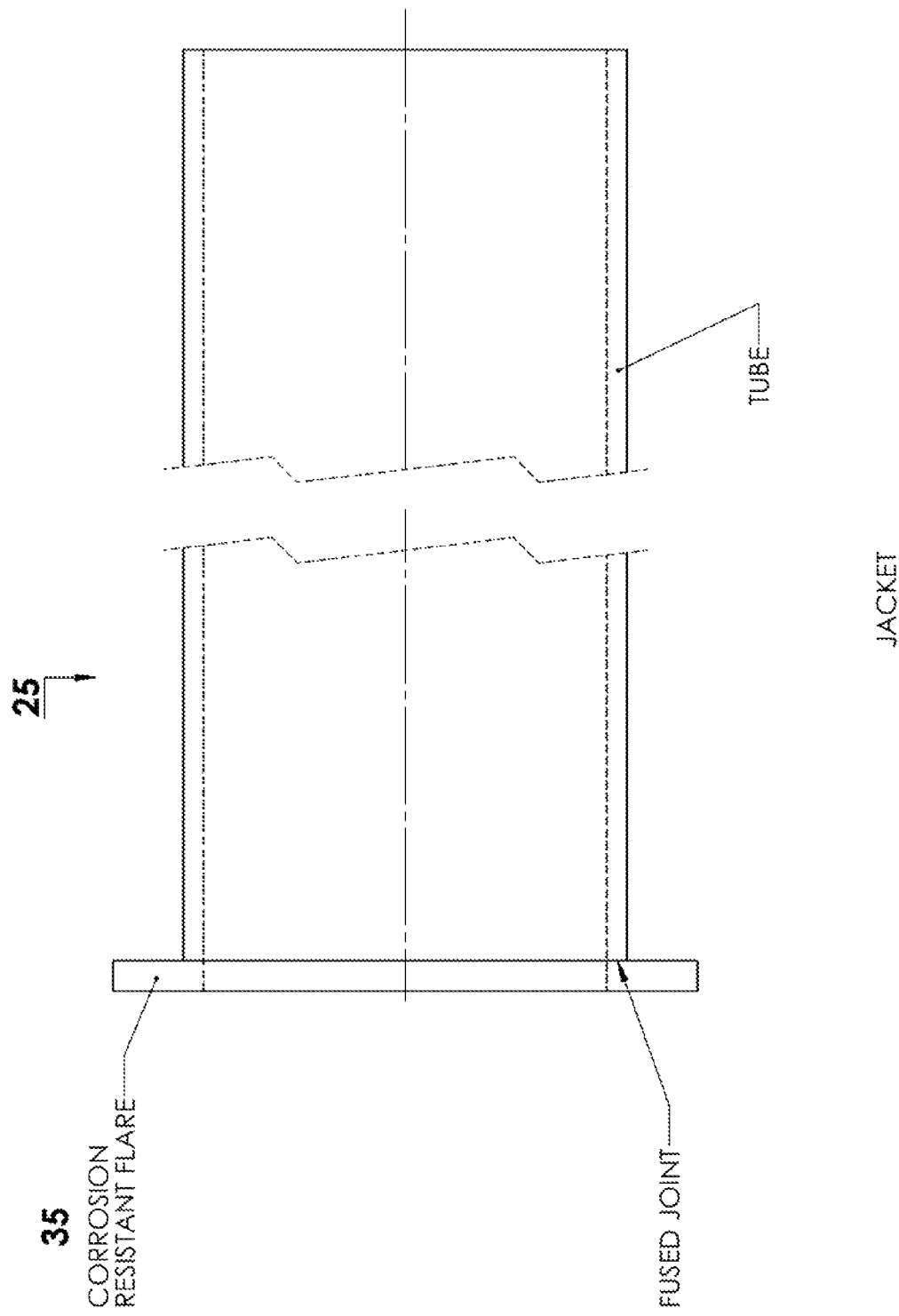
FIG. 7 is a cross-sectional schematic view of a section or sub-assembly of the PTFE jacket of the corrosion resistant thermowell in accordance with an exemplary embodiment of the claimed invention.

As shown in FIGS. 1A-B, to enhance the protection against corrosive environments, in accordance with an exemplary embodiment of the claimed invention, the metal components/parts (metal flange 21, metal tube 22, conductive well 23) that would normally come into contact with the fluid requiring temperature measurement are covered with highly corrosion resistant materials. In accordance with an exemplary embodiment of the claimed invention, a jacket 24 made of PTFE (or PTFE jacket 24) covers the face of the metal flange 21 of FIGS. 3A-B, the metal tube 22, and most of the conductive well 23. It is appreciated that other plastics can be used to achieve alternate properties. As shown in FIGS. 6A-B, 7 and 8A-B, in accordance with exemplary embodiment of the claimed invention, the PTFE jacket 24 comprises corrosion resistant flare 35 and two components or parts 25 and 26. Preferably, these two components 25 and 26 are fused or welded together to form the PTFE jacket 24.

A feature of the conductive well 23 and the mating jacket tip 26 is a thread 40. The PTFE jacket 24 tends to expand in length with the increasing temperature, thereby causing the heat conductive cup 27 or the thin corrosion resistant tip 27' to move away from the tip of the temperature measuring device, the thermocouple, RTD or thermometer residing in a pocket 31. If such expansion is not constrained or minimized, the transmission or conduction of the changing temperatures would slow dramatically, which would be counter to the basic purpose of the thermowells. In accordance with an exemplary embodiment of the claimed invention, the PTFE jacket 24 is shrunk over the metal tube 22 to constrain the expansion of the PTFE jacket 24. In accordance with another embodiment of the claimed invention, the PTFE jacket 24 is mechanically fastened to its mating conductive well 23 to constrain the expansion of the PTFE jacket 24, for example by pinning or threading the PTFE jacket 24 to the conductive well 23. Alternatively, in accordance with an exemplary embodiment of the claimed invention, as shown in FIGS. 1A-B, 2A-2B, 5A-5B, 6A-6B, 8A-8B, the PTFE jacket 24 and the conductive well 23 have mating buttress threads 40, which, because of their flat, shelf-like mating surfaces, form a strong constraint preventing the undesirable movement of the heat conductive cup 27 or the thin corrosion resistant tip 27' away from the temperature measuring device.

Turning now to FIGS. 1A-B, 9 and 10, because PTFE is not a good conductor, in accordance with an exemplary embodiment of the claimed invention, the bottom most portion of the conductive well 23 is covered with a highly corrosion resistant tantalum cup 27 or thin corrosion resistant tip 27'. As shown in FIG. 2A, in accordance with one exemplary embodiment of the claimed invention, the heat conductive cup or tantalum cup 27 is swaged over the PTFE jacket 24 to provide a leak tight seal between its inner surface and the outer surface of the jacket tip 26. In addition to its excellent corrosion resistance, tantalum is an excellent conductor of heat thus providing the potential for a quick response to changes in fluid temperature. Alternatively, as shown in FIG. 2B, in accordance with an exemplary embodiment of the claimed invention, a thin corrosion resistant tip 27', integral with jacket tip 26 as shown in FIG. 8B, provides a leak tight seal with the main body of the jacket tip 26. Of course the material, PTFE, of the thin corrosion resistant tip 27', is not a good conductor. But when certain extremely corrosive fluids attack tantalum, PTFE may be necessary for those applications. In accordance with an exemplary embodiment of the claimed invention, the corrosion resistant tip 27' is made very thin to provide adequate response time.

Figure 9:
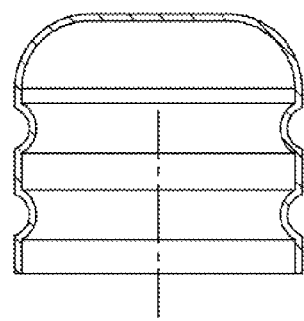
FIG. 9 is a schematic view of the heat conductive cup of the corrosion resistant thermowell of FIG. 1A in accordance with an exemplary embodiment of the claimed invention.
Figure 10:
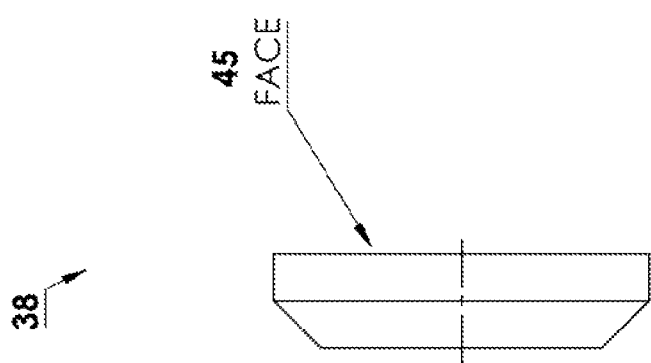
FIG. 10 is a schematic view of the conductive support tip of the corrosion resistant thermowell of FIG. 1B in accordance with an exemplary embodiment of the claimed invention.
Figure 11:
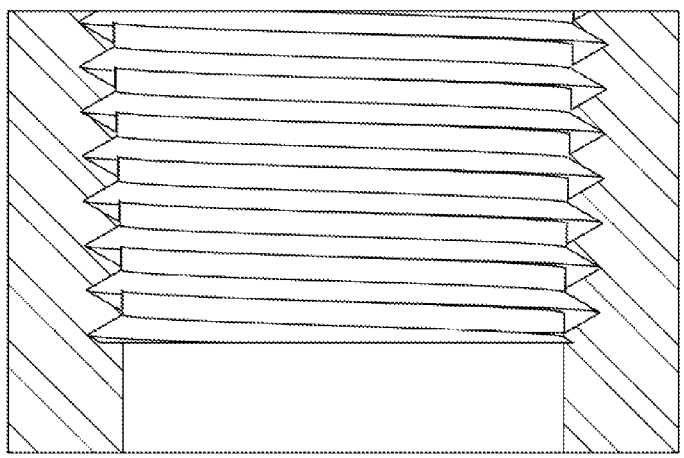
FIG. 11 is a cross-sectional view of a threaded half coupling component/part of the corrosion resistant thermowell in accordance with an exemplary embodiment of the claimed invention.

In accordance with an exemplary embodiment of the claimed invention, FIG. 9 shows a small size thin walled tantalum cup 27 that is used for all lengths and diameters of the corrosion resistant thermowells with thin wall tantalum tips 20 (hereinafter "tantalum tipped thermowells" 20) of FIG. 1A. The small diameter of the tantalum cup 27 allows for use of a thin cup with advantages described herein. First, when the tantalum cup 27 is supported by the base machined at the tip of the conductive well 23, the assembly can be used at higher fluid pressures than if just a thin unsupported cup is used. Second, the tantalum cup 27 is smaller in diameter than the metal tube 22, thereby permitting the tantalum cup 27 to be subjected to higher pressures than the typically used larger diameter cups. Third, the use of the small thin walled tantalum cup 27 in the claimed invention reduces the cost of the device because tantalum is a high cost material.

In accordance with an exemplary embodiment of the claimed invention, FIG. 2B shows the thin corrosion resistant PTFE tip 27'. The PTFE tip 27' is supported by a thin, small diameter conductive support tip 38 that allows for the PTFE corrosion resistant tip 27' to be thin walled. So even though PTFE is not a good conductor, the thin wall of the PTFE tip 27' minimizes its resistance to temperature transmission. Thus the temperature probe residing in the pocket 31 will still be sensitive to temperature changes, albeit more slowly than with the tantalum cup 27. In certain cases, where needed, corrosion resistant metals other than tantalum, for example vanadium, may be substituted for the tantalum, and achieve much the same advantages gained with the tantalum.

Turning now to FIGS. 1A-B, 11 and 12, in accordance with an exemplary embodiment of the claimed invention, the two remaining metal components or parts: the threaded metal half coupling 28 is welded to the metal flange 21, and the metal guide tube 29, advantageously allows standard, commercially available thin temperature measuring devices to be inserted into the conductive well 23, reside in the pocket 31, reach the bottom of the conductive well 23, and make contact with the tantalum cup 27 as shown in FIG. 2A or make contact with a thin wall metal tip 38 that supports the PTFE tip 27' as shown in FIG. 2B, without bending or kinking As shown in FIGS. 2A-B, in accordance with an exemplary embodiment of the claimed invention, to keep the metal guide tube 29 in place it is brazed to the conductive well 23.

As shown in FIGS. 2A-B and 5A-B, to improve the response time to fluid temperature changes, in accordance with an exemplary embodiment of the claimed invention, the tip of the conductive well 23 has a specially machined thin base with a hole or pocket 31 for thermocouple, RTD, or thermometer, machined to fit the 1/16" or larger tip of the temperature measuring device. The design of the claimed invention advantageously allows for such small diameter thermocouples, even in long length thermowells 20. It is noted that the small diameter thermocouples improve response times. Also, as shown in FIGS. 2A-B, in accordance with an exemplary embodiment of the claimed invention, the face 45 at the base of the conductive well 23 or face 45 of the conductive support tip 38, may also be installed using a thin layer of conductive paste 30 to further improve the response time.

Various omissions, modifications, substitutions and changes in the forms and details of the device illustrated and in its operation can be made by those skilled in the art without departing in any way from the spirit of the present invention. Accordingly, the scope of the invention is not limited to the foregoing specification, but instead is given by the appended claims along with their full range of equivalents.

The invention claimed is:

1. A device for providing isolation between a temperature sensor and a fluid to be measured, comprising:
   a metal guide tube to receive the temperature sensor, the metal guide tube having a top end and a bottom end;
   a conductive well having a top end and a bottom end having a base, the top end having an outer diameter greater than an outer diameter at the bottom end, the outer diameter at the bottom end being partially threaded with buttress threads, the conductive well surrounds the bottom end of the metal guide tube, the conductive well being brazed to the metal guide tube;
   a metal tube surrounding the top end of the conductive well and a remaining portion of the metal guide tube, the conductive well being brazed to the metal tube;
   a corrosion resistant jacket subassembly having at least two outer diameters excluding a corrosion resistant flare and encapsulating the metal tube and a remaining portion of the conductive well not surrounded by the metal tube;
   a thin walled, corrosion resistant and heat conductive metal cup having an outer diameter smaller than a larger of the two outer diameters of the corrosion resistant jacket subassembly, the corrosion resistant and heat conductive metal cup being located at a base of the conductive well and entirely covering a bottom end of the corrosion resistant jacket subassembly;
   a metal flange securing a top end of the device and surrounding the metal guide tube at the top end opposite the corrosion resistant and heat conductive cup;
   a metal half coupling connected to the metal flange;
   wherein the corrosion resistant flare at the end of the corrosion resistant jacket subassembly seals to a bottom face of the metal flange, the corrosion resistant flare has an outside diameter covering part or all of the bottom face of the flange and an inside diameter substantially equal to the larger of two outer diameters of the corrosion resistant jacket subassembly; and wherein the base of the conductive well comprises an opening to receive a tip of the temperature sensor.

2. The device of claim 1, wherein the conductive well is a copper conductive well.

3. The device of claim 1, wherein the corrosion resistant and heat conductive cup is a tantalum cup covering the base of the conductive well to provide a quick response to temperature changes.

4. The device of claim 1, wherein the corrosion resistant and heat conductive cup is a vanadium cup covering the base of the conductive well to provide a quick response to temperature changes.

5. The device of claim 1, wherein the metal tube is made from one of the following: carbon steel, stainless steel or alloy.

6. The device of claim 1, wherein the corrosion resistant jacket subassembly is a polytetrafluoroethylene (PTFE) jacket.

7. The device of claim 1, wherein the conductive well is a threaded conductive well and the corrosion resistant jacket subassembly is threaded to fit onto the threaded conductive well.

8. The device of claim 1, wherein the corrosion resistant and heat conductive cup is swaged over the corrosion resistant jacket subassembly to provide a leak tight seal.

9. The device of claim 1, wherein the corrosion resistant jacket subassembly comprises two components that are fused or welded together.

10. The device of claim 1, wherein a face at the base of the conductive well is installed using a thin layer of conductive paste to further improve response time.

11. A device for providing isolation between a temperature sensor and a fluid to be measured, comprising:
   a metal guide tube to receive the temperature sensor, the metal guide tube having a top end and a bottom end;
   a conductive well having a top end and a bottom end having a base, the top end having an outer diameter greater than an outer diameter at the bottom end, the conductive well surrounds the bottom end of the metal guide tube, the conductive well being brazed to the metal guide tube;
   a metal tube surrounding the top end of the conductive well and a remaining portion of the metal guide tube, the conductive well being brazed to the metal tube;
   a corrosion resistant jacket subassembly having at least two outer diameters excluding a corrosion resistant flare and encapsulating the metal tube and a remaining portion of the conductive well not surrounded by the metal tube;
   a thin walled, corrosion resistant plastic tip having an outer diameter smaller than a larger of the two outer diameters of the corrosion resistant jacket subassembly, the corrosion resistant plastic tip being located at a base of the conductive well and entirely covering and contiguous with the bottom end of the corrosion resistant jacket subassembly;
   a metal flange securing a top end of the device and surrounding the metal guide tube at the top end opposite the corrosion resistant plastic tip;
   a metal half coupling connected to the metal flange;
   wherein the corrosion resistant flare at the end of the corrosion resistant jacket subassembly seals to a bottom face of the metal flange, the corrosion resistant flare has an outside diameter covering part or all of the bottom face of the flange and an inside diameter substantially equal to the larger of two outer diameters of the corrosion resistant jacket subassembly; and
   wherein the base of the conductive well comprises an opening to receive a tip of the temperature sensor.

12. The device of claim 11, wherein the conductive well is a copper conductive well.

13. The device of claim 11, wherein the corrosion resistant plastic tip is a corrosion resistant plastic film or membrane covering the base of the conductive well and responsive to temperature changes.

14. The device of claim 11, wherein the metal tube is made from one of the following:
   carbon steel, stainless steel or alloy.

15. The device of claim 11, wherein the corrosion resistant jacket subassembly is a polytetrafluoroethylene (PTFE) jacket.

16. The device of claim 11, wherein the corrosion resistant jacket subassembly is threaded to fit onto the conductive well that is partially threaded with buttress threads.

17. The device of claim 11, wherein the corrosion resistant plastic tip is a contiguous part of the corrosion resistant jacket subassembly.

18. The device of claim 11, wherein the corrosion resistant jacket subassembly comprises two components that are fused or welded together.

19. The device of claim 11, wherein a face at the base of the conductive well is installed using a thin layer of conductive paste to further improve response time.

* * * * *